(12) United States Patent
Masukawa et al.

(10) Patent No.: US 7,396,576 B2
(45) Date of Patent: Jul. 8, 2008

(54) HONEYCOMB STRUCTURE

(75) Inventors: Naoshi Masukawa, Nishikasugai-gun (JP); Shuichi Ichikawa, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 693 days.

(21) Appl. No.: 10/504,519

(22) PCT Filed: Oct. 3, 2003

(86) PCT No.: PCT/JP03/12729

§ 371 (c)(1),
(2), (4) Date: Aug. 16, 2004

(87) PCT Pub. No.: WO2004/033070

PCT Pub. Date: Apr. 22, 2004

(65) Prior Publication Data

US 2005/0050845 A1 Mar. 10, 2005

(30) Foreign Application Priority Data

Oct. 9, 2002 (JP) ............................. 2002-295857

(51) Int. Cl.
*B32B 3/12* (2006.01)
*E04C 2/00* (2006.01)
(52) U.S. Cl. ..................................... 428/116; 52/782.1
(58) Field of Classification Search .................. 501/118, 501/119, 120, 153, 154; 428/116, 117, 119, 428/188, 913, 327, 73, 307.3, 304.4, 192, 428/34.4; 55/523, 585.3, 483, 529
See application file for complete search history.

(56) References Cited

U.S. PATENT DOCUMENTS

| 4,025,681 A | * | 5/1977 | Donnelly et al. | ............ 428/116 |
| 4,335,783 A | | 6/1982 | McBrayer et al. | |
| 5,714,226 A | * | 2/1998 | Disselbeck | .................. 428/116 |

FOREIGN PATENT DOCUMENTS

EP   0 816 065 A1   1/1998

(Continued)

OTHER PUBLICATIONS

Gulati, "Strength and Thermal Shock Resistance Wall-Flow Diesel Filters," SAE Technical Papers Series, 860008, pp. 11-18, Feb. 24-28, 1986.

*Primary Examiner*—Jennifer McNeil
*Assistant Examiner*—Gordon R. Baldwin
(74) *Attorney, Agent, or Firm*—Oliff & Berridge, PLC

(57) ABSTRACT

The present invention provides a honeycomb structure in which a plurality of honeycomb segments each constituted by a cell structure having a plurality of cells divided from each other by partition walls and functioning as a passage for fluid and an outer wall provided at the circumference of the cell structure are bonded to each other at the outer walls by a bonding layer made of a bonding agent and converted into one piece, which honeycomb structure is characterized in that the bonding agent does not contain inorganic particles having diameters (μm) of at least 1.1 times the average surface roughness Ra (μm) of the outer wall, in an amount exceeding 30% by mass relative to the total of the bonding agent. In the honeycomb structure, the honeycomb segments as a constituent are strongly bonded to each other by a bonding agent and converted into one piece.

10 Claims, 2 Drawing Sheets

FOREIGN PATENT DOCUMENTS

| | | |
|---|---|---|
| EP | 1 101 910 A2 | 5/2001 |
| EP | 1 142 619 A1 | 10/2001 |
| EP | 1 249 262 A1 | 10/2002 |
| JP | B2 61-51240 | 11/1986 |
| JP | A 2000-279729 | 10/2000 |

* cited by examiner

HONEYCOMB STRUCTURE

TECHNICAL FIELD

The present invention relates to a honeycomb structure which can be suitably used, for example, as a carrier for the catalyst used in an internal combustion engine, a boiler, a chemical reactor, a reformer of fuel cell or the like, or as a filter for capturing fine particles present in an exhaust gas. More particularly, the present invention relates to a honeycomb structure in which the honeycomb segments as a constituent are bonded strongly to each other by a bonding agent and converted into one piece.

BACKGROUND ART

Honeycomb structures are in use, for example, as a carrier for the catalyst used in an internal combustion engine, a boiler, a chemical reactor, a reformer of fuel cell or the like, or as a filter for capturing fine particles present in an exhaust gas, particularly fine particles emitted from a diesel engine (the filter is hereinafter referred to as DPF).

In general, the honeycomb structure used for such a purpose is constructed, as shown in FIG. 1(a) and FIG. 1(b), in such a way that it has a plurality of cells 23 divided from each other by partition walls 24 and functioning as a passage for fluid, each cell 23 is plugged at either of the two ends so that adjacent cells 23 are plugged alternately at each end face of the honeycomb structure to make each end face a checkered pattern. In the honeycomb structure 21 having such a construction, a subject fluid enters into those cells 23 not plugged at the inlet side end face 25 of the structure 21, i.e. those cells 23 plugged at the outlet side end face 26 of the structure 21, passes through the partition walls 24, and is discharged from adjacent cells 23, i.e. those cells 23 plugged at the inlet side end face 25 and not plugged at the outlet side end face 26. In this case, the partition walls 24 function as a filter and, when the honeycomb structure 21 is used, for example, as a DPF, the soot, etc. discharged from a diesel engine are trapped by the partition walls 24 and deposited on the partition walls 24.

In the honeycomb structure 21 used as above, the sharp temperature change of exhaust gas and the local heating make non-uniform the temperature distribution inside the honeycomb structure 21, which has caused problems such as crack generation in honeycomb structure 21 and the like. When the honeycomb structure 21 is used particularly as a DPF, it is necessary to burn the fine carbon particles deposited on the filter to remove the particles and regenerate the filter. In that case, high temperatures are inevitably generated locally in the filter; as a result, there have easily appeared a reduction in regeneration efficiency due to the non-uniformity of regeneration temperature and crack generation due to a big thermal stress.

Hence, it was proposed to bond a plurality of honeycomb segments with a bonding agent to produce a honeycomb structure. Specifically, in, for example, U.S. Pat. No. 4,335,783 is disclosed a process for producing a honeycomb structure, which comprises bonding a large number of honeycomb parts A (see FIG. 2) using a discontinuous bonding agent B.

Also in, for example, JP-B-61-51240 is proposed a heat shock-resistant rotary regenerating heat exchanging method which comprises forming, by extrusion, matrix segments of honeycomb construction made of a ceramic material, firing them, making smooth, by processing, the outer peripheral portions of the fired segments, coating the to-be-bonded areas of the resulting segments with a ceramic bonding agent having, when fired, substantially the same mineral composition as the matrix segments and showing a difference in thermal expansion coefficient, of 0.1% or less at 800° C., and firing the coated segments.

Further in, for example, a SAE article 860008 of 1986 is disclosed a ceramic honeycomb structure obtained by bonding cordierite honeycomb segments with a cordierite cement.

In the filter obtained by bonding a plurality of honeycomb segments into one piece, it is important to make sufficient a bonding strength between honeycomb segments. It is presumed that such a bonding strength is exhibited by an anchor effect which is generated by entering of particles contained in the bonding agent used, into the surface unevenness of the outer wall of each honeycomb segment. As a relevant technique developed by focussing on such an anchor effect, there is disclosed in, for example, JP-A-2000-279729, a honeycomb filter in which the surface roughness Rz of the outer wall of honeycomb segment is specified. However, when the specification of the surface roughness (absolute value) of the outer wall of honeycomb segment restricts the physical properties (e.g. pore diameter and porosity) of honeycomb segment or makes it difficult to obtain an intended pore diameter, porosity, etc., a step of processing by spray or the like becomes necessary in order to achieve a specified surface roughness (Rz) of outer wall; thus, there has been, for example, a problem of an increase in the number of production steps.

DISCLOSURE OF THE INVENTION

The present invention has been made in view of the above-mentioned problems of the prior art and aims at providing a honeycomb structure in which a plurality of honeycomb segments as a constituent are strongly bonded to each other by a bonding agent and converted into one piece.

According to the present invention, there is provided a honeycomb structure comprising: a plurality of honeycomb segments each having a cell structure and an outer wall provided at the circumference of the cell structure, the cell structure having a plurality of cells divided from each other by partition walls and functioning as a passage for fluid, the honeycomb segments being bonded to each other at the outer walls by a bonding layer made of a bonding agent and converted into one piece, characterized in that the bonding agent does not contain inorganic particles having diameters (μm) of at least 1.1 times an average surface roughness Ra (μm) of the outer wall, in an amount exceeding 30% by mass relative to the total of the bonding agent.

In the present invention, the bonding agent does not contain inorganic particles having diameters (μm) of at least 1.1 times the average surface roughness Ra (μm) of the outer wall, preferably in an amount exceeding 15% by mass relative to the total of the bonding agent and more preferably in an amount exceeding 5% by mass.

In the present invention, the bonding agent preferably contains an inorganic fiber and a colloidal oxide, and the inorganic fiber preferably has an average width in radial direction, of 1 to 20 μm and an average length in axial direction, of 10 to 100 μm.

In the present invention, each honeycomb segment is preferably made of silicon carbide (SiC) or of a silicon-silicon carbide type composite material formed by using silicon carbide (SiC) as an aggregate and silicon (Si) as a binding material.

In the present invention, the bonding layer preferably has a thickness of 0.5 to 3 mm, and the proportion of the total area of the outer wall portions of all honeycomb segments having a bonding layer, to the total area of the outer walls of all honeycomb segments is preferably 70% or more.

In the present invention, the proportion of the area of the outer wall portion of each honeycomb segment having a bonding layer, to the total area of the outer wall of each honeycomb segment is preferably 70% or more.

Meanwhile, in the present invention, the proportion of the area of the outer wall portion of each honeycomb segment having a bonding layer, to the area of the outer wall portion (bonded outer wall portion) of each honeycomb segment bonded to other honeycomb segment(s) is preferably 70% or more.

BRIEF DESCRIPTION OF THE DRAWINGS

FIG. 1(a) is a perspective view of a honeycomb structure and FIG. 1(b) is a partially enlarged top view of the end face of a honeycomb structure.

BEST MODE FOR CARRYING OUT THE INVENTION

The embodiment of the present invention is described below. However, the present invention is not restricted to the following embodiment and it should be construed that as long as the gist of the present invention is observed, change, improvement, etc. of design can be made appropriately based on the ordinary knowledge of those skilled in the art.

As previously described, the bonding strength between honeycomb segments is presumed to be exhibited by an anchor effect which is generated by entering of particles contained in the bonding agent used, into the surface unevenness of the outer wall of each honeycomb segment. Here, the ordinary bonding agent used for bonding honeycomb segments to each other contains inorganic particles such as ceramic, metal powder or the like from the standpoint of, for example, prevention of crack generation due to thermal shock, etc. by the control of properties such as thermal expansion coefficient, thermal conductivity and the like. However, a relation of the particle diameters of inorganic particles and the surface roughness of the outer wall of honeycomb segment is considered to have a large influence on the bonding strength between honeycomb segments. That is, it is considered that when the particle diameters of the inorganic particles are large relative to the degree of surface roughness of the outer wall, the exhibition of the anchor effect is impaired, resulting in a low bonding strength.

Figure 1A:
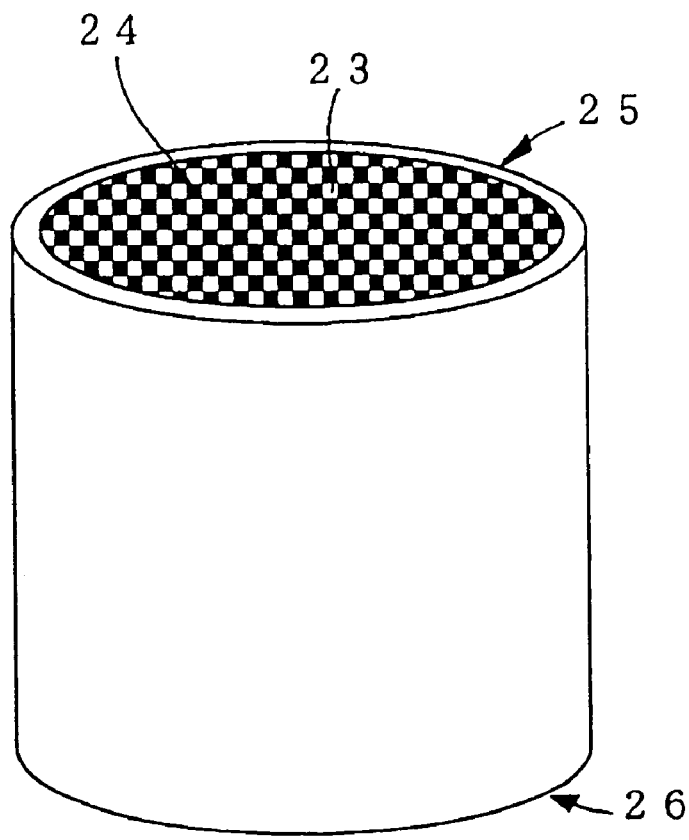
FIG. 1(a) and FIG. 1(b) are explanatory drawings of a honeycomb structure.
Figure 1B:
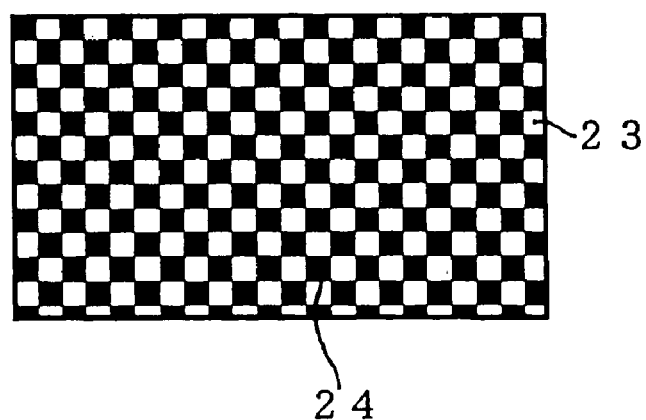
Figure 2:
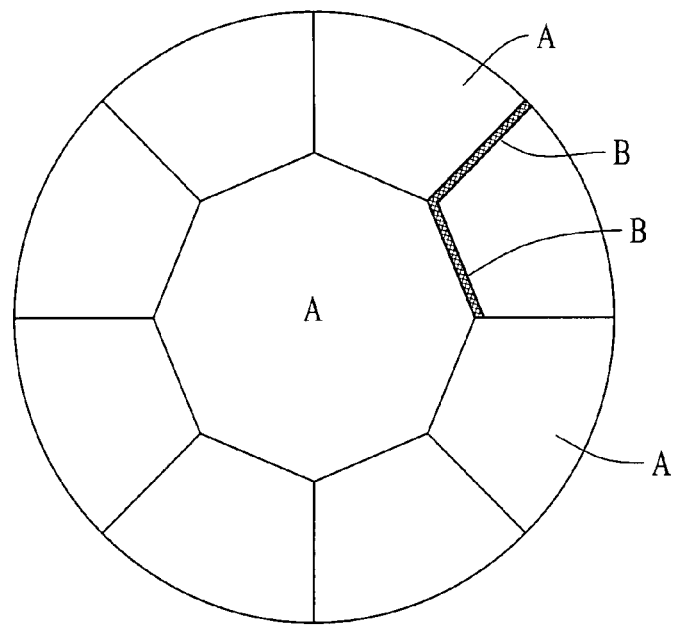
FIG. 2 shows a prior art honeycomb structure.
Figure 3:
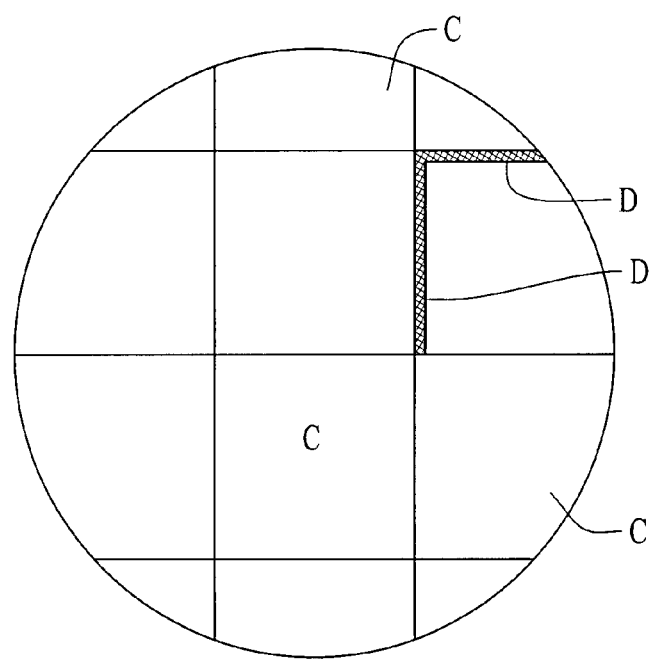
FIG. 3 shows an embodiment of a honeycomb structure.

The present invention lies in a honeycomb structure in which a plurality of honeycomb segments C (FIG. 3) each constituted by a cell structure having a plurality of cells divided from each other by partition walls and functioning as a passage for fluid and an outer wall provided at the circumference of the cell structure are bonded to each other at the outer walls by a bonding layer made of a bonding agent D and converted into one piece. The honeycomb structure is characterized in that the bonding agent D does not contain inorganic particles having diameters (μm) of at least 1.1 times the average surface roughness Ra (μm) of the outer wall (the inorganic particles are hereinafter referred to as "large-diameter inorganic particles"), in an amount exceeding 30% by mass relative to the total of the bonding agent used. The detail of the honeycomb structure is described below.

In the honeycomb structure of the present invention, the bonding agent used in bonding the honeycomb segments constituting the honeycomb structure does not contain large-diameter inorganic particles in an amount exceeding 30% by mass relative to the total of the bonding agent used. Thus, the content, in the bonding agent used, of the large-diameter inorganic particles which impair the above-mentioned anchor effect owing to their sizes relative to the average surface roughness Ra (the degree of surface unevenness) of the outer wall of honeycomb segment, is specified in a predetermined numerical range. Therefore, the honeycomb structure of the present invention exhibits a high bonding strength independently of the physical properties (e.g. pore diameter and porosity) of honeycomb segment and can withstand a thermal stress generated depending upon, for example, the installation condition.

Also, the bonding agent can be produced so as to correspond to the surface roughness of the outer wall of honeycomb segment; therefore, no special step (e.g. processing by spray) is required in order to allow the surface roughness of the outer wall to fall in a specified range. Thus, the steps for production of the present honeycomb structure are not complicated and the present honeycomb structure can be produced very easily. Incidentally, the "average surface roughness Ra (μm)" referred to in the present invention is an arithmetical average roughness calculated based on ISO 4287/1 and is a value (μm) calculated as an average of absolute deviations from the average line of the surface roughness of the outer wall.

When the large-diameter inorganic particles are contained in the bonding agent used, in an amount exceeding 30% by mass relative to the total of the bonding agent, the bonding strength between honeycomb segments is significantly low and, when the resulting honeycomb structure is subjected to, for example, canning, there may appear inconveniences such as breakage and the like during the actual use of the honeycomb structure. Therefore, such an amount is not preferred. In the present invention, there may be a case when no large-diameter inorganic particles are contained in the bonding agent; however, the large-diameter inorganic particles may be contained in a very small amount (about 0.1% by mass) from the standpoint of, for example, prevention of crack generation caused by thermal shock, etc. From the standpoint of exhibition of a higher bonding strength, it is preferred that the large-diameter inorganic particles are not contained in an amount exceeding 15% by mass relative to the total of the bonding agent used, and it is more preferred that they are not contained in an amount exceeding 5% by mass.

Incidentally, in the present invention, the bonding agent D (FIG. 3) may contain inorganic particles other than the above-mentioned large-diameter inorganic particles, that is, inorganic particles having particle diameters (μm) of less than 1.1 times the average surface roughness Ra (μm) of the outer wall of honeycomb segment. As the kinds of these inorganic particles and the above-mentioned large-diameter inorganic particles, there can be suitably used, for example, a ceramic selected from the group consisting of silicon carbide, silicon nitride, cordierite, alumina, mullite, zirconia, zirconium phosphate, aluminum titanate, titania and combinations thereof, a Fe—Cr—Al type metal, a nickel-based metal, or metallic silicon (Si) and silicon carbide (SiC).

In the present invention, the bonding agent preferably contains an inorganic fiber and a colloidal oxide. As the inorganic fiber, there can be preferably used a ceramic fiber (e.g. an aluminosilicate or silicon carbide), a metal fiber (e.g. copper or iron) or the like. As the shape of the inorganic fiber, there can be preferably used such a shape that the average radial-direction length (average fiber diameter) of inorganic fiber is 1 to 20 μm and the average axial-direction length (average fiber length) of inorganic fiber is 10 to 100 µm. The average fiber diameter of inorganic fiber is more preferably 3 to 15 µm, particularly preferably 5 to 10 µm; and the average fiber length of inorganic fiber is more preferably 10 to 80 µm, particularly preferably 20 to 60 µm.

When the fiber diameter of inorganic fiber is less than 1 µm, the bonding agent shows a large shrinkage when dried and cracks may generate; when the fiber diameter is more than 20 µm, it is difficult to coat the bonding agent in a uniform thickness; therefore, such fiber diameters are not preferred. When the fiber length of inorganic fiber is less than 10 µm, the bonding agent shows a large shrinkage when dried and cracks may generate; when the fiber length is more than 100 µm, a large amount of water is needed in order to produce a bonding agent paste (which is coatable) and the use of such a large amount of water in the paste makes large the shrinkage of bonding agent when dried and tends to generate cracks; therefore, such fiber lengths are not preferred.

As the colloidal oxide, there can be mentioned, as preferred examples, a silica sol and an alumina sol. The colloidal oxide is preferred in order to impart an appropriate adhesion strength to the bonding agent and further, when dried and dehydrated, bonds to the inorganic fiber and the inorganic particles, which can make the dried bonding agent superior in heat resistance, etc. and strong. Since the colloidal oxide bonds irreversibly when dried particularly at 150° C. or a higher temperature, the dried bonding agent can be allowed to have superior chemical durability. Incidentally, the bonding agent is preferred to have a relatively low thermal expansion coefficient in order to prevent crack generation caused by thermal shock, etc. Specifically, the thermal expansion coefficient of the bonding agent is preferably in a range of $1 \times 10^{-6}$ to $8 \times 10^{-6}/°$ C., more preferably in a range of $1.5 \times 10^{-6}$ to $7 \times 10^{-6}/°$ C., particularly preferably in a range of $2 \times 10^{-6}$ to $6 \times 10^{-6}/°$ C.

As the material constituting the honeycomb segment, various ceramics (e.g. oxides and non-oxides), etc. are considered. In the present invention, the honeycomb segment is preferred to be made of, in particular, silicon carbide (SiC) or a silicon-silicon carbide type composite material formed by using silicon carbide (SiC) as an aggregate and silicon (Si) as a binding material.

In the present invention, the bonding layer which bonds the outer walls of honeycomb segments to each other, has a thickness of preferably 0.5 to 3 mm, more preferably 0.5 to 2.5 mm, particularly preferably 0.5 to 2.0 mm. When the thickness is less than 0.5 mm, the resulting honeycomb structure is low, in the actual use, in the capability of releasing the thermal stress of individual honeycomb segments (the base material of the honeycomb structure) into the bonding layer, which may invite crack generation in the base material. Meanwhile, a thickness of more than 3 mm is not preferred because the effective filtering area of honeycomb segment becomes 80% or less and further because, when the resulting honeycomb structure is used as a DPF, the inside-honeycomb-structure temperature becomes non-uniform during soot regeneration, which invites a reduction in regeneration efficiency and easy crack generation caused by a large thermal stress.

The proportion of the total area of the outer wall portions of all honeycomb segments having a bonding layer, to the total area of the outer walls of all honeycomb segments is preferably 70% or more, more preferably 80% or more, particularly preferably 90% or more. A proportion of less than 70% is not preferred because the durability to vibration is low and the breakage of honeycomb structure may occur and further because soot leakage may occur when the honeycomb structure is used as a DPF. Incidentally, in the present invention, there is specified no upper limit for the proportion (%) of the total area of the outer wall portions of all honeycomb segments having a bonding layer, to the total area of the outer walls of all honeycomb segments; however, the proportion is most preferably 100%.

In the present invention, the proportion of the area of the outer wall portion of each honeycomb segment having a bonding layer, to the total area of the outer wall of each honeycomb segment is preferably 70% or more, more preferably 80% or more, particularly preferably 90% or more. A proportion of less than 70% is not preferred because the durability to vibration is low and the breakage of honeycomb structure may occur and further because soot leakage may occur when the honeycomb structure is used as a DPF. Incidentally, in the present invention, there is specified no upper limit for the proportion (%) of the area of the outer wall portion of each honeycomb segment having a bonding layer, to the total area of the outer wall of each honeycomb segment; however, the proportion is most preferably 100%.

In the present invention, the proportion of the area of the outer wall portion of each honeycomb segment having a bonding layer, to the area of the outer wall portion (bonded outer wall portion) of each honeycomb segment bonded to other honeycomb segment(s) is preferably 70% or more, more preferably 80% or more, particularly preferably 90% or more. A proportion of less than 70% is not preferred because the durability to vibration is low and the breakage of honeycomb structure may occur and further because soot leakage may occur when the honeycomb structure is used as a DPF. Incidentally, in the present invention, there is specified no upper limit for the proportion of the area of the outer wall portion of each honeycomb segment having a bonding layer, to the total area of the bonded outer wall portion of each honeycomb segment; however, the proportion is most preferably 100%.

There is no particular restriction as to the thermal conductivity of each honeycomb segment. However, too large a thermal conductivity is not preferred because the heat release of honeycomb structure is too large and, when the honeycomb structure is used, for example, as a DPF, no sufficiently high temperature is obtained during the regeneration, resulting in a low regeneration efficiency. Too small a thermal conductivity is not preferred, either, because the heat release is too small and too large a temperature increase is incurred. Therefore, the thermal conductivity at 40° C. is preferably 10 to 60 W/mK, more preferably 15 to 55 W/mK, particularly preferably 20 to 50 W/mK.

In the present invention, there is no particular restriction as to the cell density (the number of cells per unit sectional area) of the honeycomb structure. However, too small a cell density results in an insufficient strength and an insufficient GSA (geometrical surface area) when the honeycomb structure is used as a filter; too large a cell density results in a large pressure loss when a subject fluid passes through the honeycomb structure. The cell density is preferably 6 to 2,000 cells/in.$^2$ (0.9 to 311 cells/cm$^2$), more preferably 50 to 1,000 cells/in.$^2$ (7.8 to 155 cells/cm$^2$), particularly preferably 100 to 400 cells/in.$^2$ (15.5 to 62.0 cells/cm$^2$). There is no particular restriction, either, as to the sectional shape of each cell; however, the sectional shape is preferred to be either of a triangle, a tetragon, a hexagon and a corrugation for easy production.

Further, there is no particular restriction as to the sectional shape of the present honeycomb structure. The sectional shape can be, for example, a circle, an ellipse, a race truck shape, a polygon (e.g. a triangle, a quasi-triangle, a tetragon or a quasi-tetragon) or an irregular shape. There is no particular restriction, either, as to the shape of the end face of honeycomb segment. The shape can be a square, an ellipse, a race truck shape, a polygon (e.g. a triangle, a quasi-triangle, a tetragon or a quasi-tetragon) or an irregular shape.

When the present honeycomb structure is used particularly as a DPF, it is preferred that predetermined cells are plugged at the opening ends at one end face of the honeycomb structure and the remaining cells are plugged at the opening ends at the other end face of the honeycomb structure. It is particularly preferred that each cell is plugged at either of the two opening ends and adjacent cells are plugged alternately at each end face of the honeycomb structure so that each end face looks like a checkered pattern. By plugging cells as above, for example, a subject fluid entering into the honeycomb structure from the one end face passes through the partition walls and leaves from the other end face; the partition walls function as a filter when the subject fluid passes therethrough; thus, the removal of an intended substance is made possible.

As the agent used for plugging, a ceramic (e.g. an oxide or a non-oxide) or the like is considered. However, from the standpoints of strength, heat resistance, etc., there can be suitably used at least one kind of material selected from the group consisting of cordierite, mullite, alumina, spinel, silicon carbide, a silicon carbide-cordierite type composite material, a silicon-silicon carbide type composite material, silicon nitride, lithium aluminum silicate, aluminum titanate, a Fe—Cr—Al type metal and combinations thereof.

The present honeycomb structure is preferably loaded with a catalyst, specifically a metal having a catalytic activity when the honeycomb structure is intended to be used as a carrier for the catalyst used for purification of an exhaust gas emitted from a heat engine (e.g. an internal combustion engine) or a combustion apparatus (e.g. a boiler) or for reforming of a liquid fuel or a gaseous fuel. As representative metals having a catalytic activity, there can be mentioned, for example, Pt, Pd and Rh. Preferably, at least one kind selected from them is loaded on the honeycomb structure.

Next, description is made on an example of a preferred process for producing the present honeycomb structure. First, a raw material is made into clay by a clay-forming step. In the clay-forming step, there are added, to, for example, silicon carbide particles or a combination of a silicon carbide powder and a metal silicon powder (these two powders become a silicon-silicon carbide type composite material), a binder (e.g. methyl cellulose and hydroxypropoxyl methylcellulose). There are further added a surfactant and water. They are kneaded to form clay.

Then, the clay is subjected to extrusion molding in a molding step to obtain a honeycomb-shaped molded body having a plurality of cells divided from each other by partition walls and functioning as a passage for fluid. In the extrusion molding, there can be used, for example, a plunger type extruder and a twin-screw type continuous extruder. Use of the twin-screw type continuous extruder makes it possible to conduct the clay-forming step and the molding step continuously.

Next, the molded body obtained is dried using, for example, a microwave, dielectric drying and/or hot air, or the like and then fired to obtain a fired material (a honeycomb segment). The firing temperature and atmosphere can be varied appropriately depending upon the raw material used. Those skilled in the art can select a firing temperature and atmosphere most suitable to the raw material used. For example, when the raw material used is a combination of a silicon carbide powder and a metallic silicon powder, heating and debinding is conducted in the air or a $N_2$ atmosphere and then firing can be conducted at about 1,400 to 1,800° C. in an Ar atmosphere. For the firing, a single kiln or a continuous kiln (e.g. a tunnel) is used ordinarily, and debinding and firing can be conducted simultaneously.

A plurality of honeycomb segments formed above are bonded to each other using the above-mentioned bonding agent, whereby a honeycomb structure (a bonded material) according to the present invention can be obtained. When the honeycomb structure is used as a filter, particularly as a DPF or the like, it is preferred that each cell is plugged at either of the opening ends and adjacent cells are plugged alternately at each end face of the honeycomb structure so that each end face of the honeycomb structure looks like a checkered pattern. The plugging can be carried out by masking, at each end face of the honeycomb structure, those cell opening ends not to be plugged, applying a bonding agent of slurry state to those cell opening ends to be plugged, and conducting drying, firing, etc.

Incidentally, at least part of the circumference of the honeycomb structure (bonded material) obtained by bonding of honeycomb segments can be removed as necessary. Specifically, it is preferred, for example, to remove cells present in the range of at least two cells from the outermost periphery and it is more preferred to remove cells present in the range of two to four cells from the outermost periphery. Here, removal of cells means that at least part of the partition walls forming these cells is removed to convert the honeycomb structure into a state that the circumference is not completely surrounded by partition walls. The removal can be conducted, for example, by grinding of the bonded material at the circumference.

When at least part of the circumference of the bonded material has been removed, a coating agent is applied to the removed portion to form an outer wall for the honeycomb structure. The coating agent preferably contains at least one kind selected from colloidal silica, colloidal alumina, a ceramic fiber and ceramic particles. As the ceramic particles, there can be mentioned, for example, silicon carbide.

In addition to the ceramic particles, the coating agent preferably contains colloidal silica and/or colloidal alumina, more preferably contains further a ceramic fiber, particularly preferably contains further an inorganic binder, and most preferably contains further an organic binder. To these raw materials is added a liquid component such as water or the like to obtain a coating material of slurry state. it is preferred to apply this slurry-state coating agent. By applying the coating agent and then conducting drying by heating or the like, a honeycomb structure of the present invention can be obtained.

The present invention is described more specifically below by way of Examples. However, the present invention is not restricted to these Examples.

(Production of Honeycomb Segments)

As a raw material, there were mixed a silicon carbide (SiC) powder and a metallic silicon (Si) powder each having an average particle diameter shown in Table 1, at a 80:20 mass ratio. Thereto were added, as a pore-forming agent, a poly methyl methacrylate, methyl cellulose and hydroxypropoxyl methylcellulose. There were further added a surfactant and water to produce clay having plasticity. The clay was subjected to extrusion molding and the extrudate was dried using a microwave and hot air to obtain a molded body having a partition wall thickness of 380 µm, a cell density of about 31.0 cells/cm$^2$ (200 cells/in.$^2$), a square section of 35 cm×35 cm and a length of 152 mm. The molded body was plugged with the same material as used for the molded body, in such a way that each cell was plugged at either of the two opening ends and adjacent cells were plugged alternately at each end face of the molded body so that each end face of the molded body looked like a checkered pattern, after which the molded body was dried and then subjected to debinding at about 400° C. in the air. Then, the molded body was fired at about 1,450° C. in an Ar inert atmosphere to obtain three kinds of honeycomb segments (honeycomb segments A to C) each made of a silicon-silicon carbide type composite material. Each of the honeycomb segments was measured for the surface roughness Ra (μm) of outer wall. The results are shown in Table 1. Incidentally, the surface roughness Ra (μm) refers to an arithmetical average roughness calculated based on ISO 4287/1 and is a value calculated as an average of absolute deviations from the average line of the surface roughness of outer wall.

TABLE 1

| Honeycomb segment | Average particle diameter of silicon carbide (SiC) powder (μm) | Average particle diameter of metallic silicon (Si) powder (μm) | Surface roughness (μm) |
|---|---|---|---|
| A | 48 | 5 | 7 |
| B | 33 | 5 | 5.3 |
| C | 12 | 5 | 2.1 |

(Production of Bonding Agents)

As inorganic particles to be compounded in a bonding agent to be produced, there were used two kinds of silicon carbide (SiC) powders (silicon carbide powders a and b) shown in Table 2. Incidentally, in Table 2, "10% diameter (μm)", "50% diameter (μm)" and "90% diameter (μm)" mean particle diameters at which, in the particle diameter distribution of silicon carbide (SiC) powder, cumulative frequencies from small size side are 10%, 50% and 90%, respectively.

There were mixed, in proportions shown in Table 3, a silicon carbide (SiC) powder shown in Table 2, an aluminosilicate fiber having an average fiber diameter of 7 μm and an average fiber length of 20 μm, a silica gel (a 40 mass % aqueous solution) and a clay. Thereto was added water. They were kneaded for 30 minutes using a mixer to produce 7 kinds of bonding agents ① to ⑦. Incidentally, in Table 3 are shown contents (mass %) of inorganic particles each having particle diameters (μm) of at least 1.1 times the average surface roughness Ra (μm) shown in Table 1, of the outer wall of honeycomb segment.

TABLE 2

| Silicon carbide powder (SiC) | 10% diameter (μm) | 50% diameter (μm) | 90% diameter (μm) |
|---|---|---|---|
| a | 0.8 | 2.4 | 5.5 |
| b | 6 | 13 | 22 |

(Production of Honeycomb Structures)

A plurality of honeycomb segments A, B or C were bonded to each other using a bonding agent, so that the thickness of the bonding layer formed became 1 mm. Each bonded material obtained was dried at 200° C. for 5 hours to obtain honeycomb structures (Examples 1 to 15 and Comparative Examples 1 to 6). Incidentally, the proportion of the area of the outer wall portion of each honeycomb segment having a bonding layer, to the total area of the outer wall of each honeycomb segment was 90%. In Table 4 are shown a combination of the honeycomb segment used (A, B or C) and the bonding agent used (either of ① to ⑦) and a content (mass %) of large-diameter inorganic particles.

(Measurement of Bonding Strength)

A sample required for strength measurement was cut out from each of the honeycomb structures of Examples 1 to 15 and Comparative Examples 1 to 6 and measured for bonding strength by the three-point bending test of JIS R 1601. The results are shown in Table 4.

TABLE 4

| | Kind of segment | Kind of bonding agent | Content of large-diameter inorganic particles *1 (mass %) | Bonding strength by 3-Point bending (MPa) |
|---|---|---|---|---|
| Example 1 | A | ① | 0 | 3.5 |
| Example 2 | A | ② | 0.1 | 3.2 |
| Example 3 | A | ③ | 0.4 | 3 |
| Example 4 | A | ④ | 1 | 2.8 |
| Example 5 | A | ⑤ | 1.3 | 2.7 |
| Example 6 | A | ⑥ | 29 | 1 |
| Example 7 | B | ① | 0 | 3.5 |
| Example 8 | B | ② | 0.4 | 2.9 |
| Example 9 | B | ③ | 1.4 | 2.7 |
| Example 10 | B | ④ | 3.5 | 2.5 |
| Example 11 | B | ⑤ | 4.6 | 2.4 |
| Example 12 | C | ① | 0 | 3.5 |
| Example 13 | C | ② | 3 | 2.5 |
| Example 14 | C | ③ | 10 | 1.9 |
| Example 15 | C | ④ | 25 | 1.1 |
| Comp. Example 1 | A | ⑦ | 43 | 0.2 |
| Comp. Example 2 | B | ⑥ | 31 | 0.3 |
| Comp. Example 3 | B | ⑦ | 46 | 0.1 |
| Comp. Example 4 | C | ⑤ | 33 | 0.2 |
| Comp. Example 5 | C | ⑥ | 33 | Peeling |
| Comp. Example 6 | C | ⑦ | 49 | Peeling |

*1: Inorganic particles having particle diameters of at least 1.1 times the surface roughness Ra of outer wall.

TABLE 3

| Kind of bonding agent | Kind of SiC powder | Proportion of SiC powder (mass %) | Proportion of ≧2.3 μm (mass %) | Proportion of ≧5.8 μm (mass %) | Proportion of ≧7.7 μm (mass %) | Proportion of aluminosilicate fiber (mass %) | Silica gel (mass %) | Clay mineral (mass %) | Water (mass %) |
|---|---|---|---|---|---|---|---|---|---|
| ① | — | 0 | 0 | 0 | 0 | 53 | 30 | 1 | 16 |
| ② | a | 6 | 3 | 0.4 | 0.1 | 50 | 30 | 1 | 13 |
| ③ | a | 20 | 10 | 1.4 | 0.4 | 41 | 27 | 1 | 11 |
| ④ | a | 50 | 25 | 3.5 | 1 | 19 | 16 | 1 | 14 |
| ⑤ | a | 66 | 33 | 4.6 | 1.3 | 10 | 10 | 1 | 13 |
| ⑥ | b | 34 | 33 | 31 | 29 | 32 | 22 | 1 | 11 |
| ⑦ | b | 50 | 49 | 46 | 43 | 21 | 15 | 1 | 13 |

(Evaluation)

As is clear from the results of Table 4, when the content of inorganic particles (large-diameter inorganic particles) having particle diameters of at least 1.1 times the average surface roughness of the outer wall of honeycomb segment is more than 30% by mass relative to the total of the bonding agent used, the bonding strength obtained is apparently low as compared with when the content is 30% by mass or less. Further, as the content of large-diameter inorganic particles is lower, the bonding strength obtained is higher. From the above results, the meritorious effects of the present invention have been confirmed.

INDUSTRIAL APPLICABILITY

As described above, in the present honeycomb structure, the bonding agent used for bonding the outer walls of honeycomb segments constituting the structure, to each other does not contain inorganic particles having particle diameters (μm) of at least a predetermined level relative to the surface roughness Ra (μm) of the outer wall of honeycomb segment, in an amount exceeding a predetermined proportion relative to the total of the bonding agent used; therefore, the honeycomb segments are bonded strongly to each other by the bonding agent, independently of their properties such as pore diameter, porosity and the like and are converted into one piece. Further, no special operation is needed for control of the surface roughness of the outer wall of honeycomb segment and the present honeycomb structure can be produced very easily.

The invention claimed is:

1. A honeycomb structure comprising:
a plurality of honeycomb segments each having a cell structure and an outer wall provided at the circumference of the cell structure,
the cell structure having a plurality of cells divided from each other by partition walls and functioning as a passage for fluid,
the honeycomb segments being bonded to each other at the outer walls by a bonding layer made of a bonding agent and converted into one piece, the bonding agent containing inorganic particles,
characterized in that the bonding agent does not contain inorganic particles having diameters (μm) of at least 1.1 times an average surface roughness Ra (μm) of the outer wall, in an amount exceeding 30% by mass relative to the total of the bonding agent.

2. A honeycomb structure according to claim 1, wherein the bonding agent does not contain inorganic particles having diameters (μm) of at least 1.1 times the average surface roughness Ra (μm) of the outer wall, in an amount exceeding 15% by mass relative to the total of the bonding agent.

3. A honeycomb structure according to claim 1, wherein the bonding agent does not contain inorganic particles having diameters (μm) of at least 1.1 times the average surface roughness Ra (μm) of the outer wall, in an amount exceeding 5% by mass relative to the total of the bonding agent.

4. A honeycomb structure according to claim 1, wherein the bonding agent contains an inorganic fiber and a colloidal oxide.

5. A honeycomb structure according to claim 4, wherein the inorganic fiber has an average width in radial direction, of 1 to 20 μm and an average length in axial direction, of 10 to 100 μm.

6. A honeycomb structure according to claim 1, wherein each honeycomb segment is made of silicon carbide (SiC) or of a silicon-silicon carbide type composite material formed by using silicon carbide (SiC) as an aggregate and silicon (Si) as a binding material.

7. A honeycomb structure according claim 1, wherein the bonding layer has a thickness of 0.5 to 3 mm.

8. A honeycomb structure according to claim 1, wherein the proportion of the total area of the outer wall portions of all honeycomb segments having a bonding layer, to the total area of the outer walls of all honeycomb segments is 70% or more.

9. A honeycomb structure according to claim 1, wherein the proportion of the area of the outer wall portion of each honeycomb segment having a bonding layer, to the total area of the outer wall of each honeycomb segment is 70% or more.

10. A honeycomb structure according to claim 1, wherein the proportion of the area of the outer wall portion of each honeycomb segment having a bonding layer, to the area of the outer wall portion (bonded outer wall portion) of each honeycomb segment bonded to other honeycomb segment(s) is 70% or more.

* * * * *